(12) United States Patent
Itagaki

(10) Patent No.: US 8,462,685 B2
(45) Date of Patent: Jun. 11, 2013

(54) RADIO COMMUNICATION APPARATUS, RADIO COMMUNICATION METHOD, PROGRAM AND RADIO COMMUNICATION SYSTEM

(75) Inventor: Takeshi Itagaki, Tokyo (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 12/468,602

(22) Filed: May 19, 2009

(65) Prior Publication Data

US 2009/0290521 A1 Nov. 26, 2009

(30) Foreign Application Priority Data

May 23, 2008 (JP) ................. P2008-135972

(51) Int. Cl.
*H04B 7/185* (2006.01)
*G08C 17/00* (2006.01)

(52) U.S. Cl.
USPC .......................................... 370/311; 370/318

(58) Field of Classification Search
USPC ............. 370/327, 343.3, 343.4, 343.5, 343.6, 370/343, 331, 395.2, 401; 455/343.3, 343.4, 455/343.5, 343.6; 340/7.32, 7.38
See application file for complete search history.

(56) References Cited

U.S. PATENT DOCUMENTS

| 7,130,289 B2 * | 10/2006 | Kuan et al. ................. 370/338 |
| 7,688,772 B2 * | 3/2010 | Sinivaara et al. ............. 370/318 |
| 7,697,457 B2 * | 4/2010 | Igarashi et al. ............... 370/254 |
| 8,259,632 B2 * | 9/2012 | Seok et al. .................... 370/311 |
| 2006/0079232 A1 | 4/2006 | Omori et al. |
| 2008/0056133 A1 | 3/2008 | Deshpande et al. |

FOREIGN PATENT DOCUMENTS

| JP | 2005-269508 | 9/2002 |
| JP | 2005-159958 | 6/2005 |
| JP | 2005-267184 | 9/2005 |
| JP | 2006-93787 | 4/2006 |
| JP | 2006-093945 | 4/2006 |
| JP | 2010-503286 | 1/2010 |
| WO | WO 2008/036311 A2 | 3/2008 |

OTHER PUBLICATIONS

Y. Seok et al., "IEEE P802.11 Wireless LANs—Normative Text for Peer Power Save Mode," URL: https://mentor.ieee.org/802.11/dcn/08/11-08-0071-00-000z-normative-text-for-peer-power-save-mode.doc>, pp. 1-8 (Jan. 14, 2008).

(Continued)

*Primary Examiner* — Ian N Moore
*Assistant Examiner* — Thai Nguyen
(74) *Attorney, Agent, or Firm* — Sherr & Jiang, PLLC

(57) ABSTRACT

A radio communication apparatus, including a communication control part that controls direct communication or relay communication via a base station with other radio communication apparatuses, a data generation part that generates a mode transition notification to notify the other radio communication apparatuses, which are targets of the direct communication, of a transition to a power thrifty mode or a switching request, notification to request switching from the direct communication to the relay communication via the base station, and the mode transition notification to the base station, and a mode control part that causes the transition of an operation mode to the power thrifty mode after all responses to the mode transition notification and the switching request notification are received.

5 Claims, 9 Drawing Sheets

OTHER PUBLICATIONS

Anonymous, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY), Specifications; IEEE Standard 802.11-2007 (Revision of IEEE Standard 802)" IEEE Standard, IEEE, Piscataway, NJ, pp. C1-1184 (Jun. 12, 2007).

M. Wentink, "IEEE P802.11 Wireless LANs—Speculative TGz Draft 0.3", URL: https://mentor.ieee.org/802.11/dcn/08/11-08-0406-00-000z-speculative-draft-p80211z-d0-3-with-approved-tex-and-peer-powersaving.doc>, pp. 1-37 (Mar. 20, 2008).

European Search Report in corresponding application EP 09 16 0838 (Dec. 9, 2009).

* cited by examiner

FIG. 4

| Frame Control | Duration/ID | Address1 | Address2 | Address3 | Sequence Control | Address4 | Qos Control | Frame Body | FCS |

FIG. 5

| Protocol Version | Type | Sub Type | To DS | From DS | More Frag | Retry | Pwr Mgt | More Data | Protected | Order |

RADIO COMMUNICATION APPARATUS, RADIO COMMUNICATION METHOD, PROGRAM AND RADIO COMMUNICATION SYSTEM

BACKGROUND OF THE INVENTION

1. Field of the Invention

The present invention relates to a radio communication apparatus, a radio communication method, a program, and a radio communication system.

2. Description of the Related Art

Nowadays, radio LAN (Local Area Networks) standards such as IEEE802.11a and IEEE802.11b have been developed. In such radio LAN standards, an infrastructure mode in which an access point (base station) arbitrates access timing for a plurality of radio communication apparatuses and an ad hoc mode in which access timing is decided between radio communication apparatuses are mentioned.

The infrastructure mode via an access point has a disadvantage that throughput is lower than the ad hoc mode, but has an advantage that subordinate radio communication apparatuses can connect to a wire LAN or the Internet. The ad hoc mode has higher throughput because radio communication apparatuses directly communicate with each other so that there is no overhead due to an access point relay, but has a disadvantage that a wire LAN or the Internet may not be connected.

The TDLS (Tunneled Direct. Link Setup) method is defined in IEEE802.11z as a method that can make use of advantages of each mode. According to the TDLS method, radio communication apparatuses can directly communicate by setting up a direct link (direct communication link) while maintaining the infrastructure mode. Also in these days, PPSM (Peer Power Save Mode) for radio communication apparatuses to enter the power save mode even after the direct, link being set up. For example, Japanese Patent Application Laid-Open No. 2006-93945 describes content of a radio communication apparatus notifying a base station under whose command the radio communication apparatus is of transition into power save mode.

SUMMARY OF THE INVENTION

However, if, like the proposed PPSM, a radio communication apparatus enters the power save mode (power thrifty mode) simply by notifying one radio communication apparatus to which a direct link is set up of the transition, other radio communication apparatuses to which, a direct, link is set up and the base station may not be able to grasp the transition so that communication could be disrupted.

Thus, the present. Invention has been developed in view of the above issue and there is a need to provide a novel and improved radio communication apparatus, radio communication, method, program, and radio communication system capable of entering the power thrifty mode while maintaining stability of communication.

According to an embodiment of the present invention, there is provided a radio communication apparatus, including a communication control part that controls direct communication or relay communication via a base station with one or two or more other radio communication apparatuses, a data generation part that generates a mode transition notification to notify all other radio communication apparatuses, which are targets of the direct communication, of a transition to a power thrifty mode or a switching request notification to request switching from the direct communication to the relay communication via the base station, and the mode transition notification to the base station, and a mode control part that causes the transition of an operation mode to the power thrifty mode after all responses to the mode transition notification and the switching request notification are received.

The data generation part may generate the mode transition notification for those radio communication apparatuses, among the other radio communication apparatuses, having a function to transmit, data to a radio communication apparatus when a request is transmitted from the radio communication apparatus that has entered the power thrifty mode and the switching request notification for the other radio communication apparatuses that do not have the function.

The communication control part may exercise control so that the mode transition notification to the base station is transmitted after the switching request notification being transmitted.

According to another embodiment of the present invention, there is provided, a radio communication method, including the steps of: controlling direct communication or relay communication via a base station with one or two or more other radio communication apparatuses; generating a mode transition notification to notify all other radio communication apparatuses, which are targets of the direct, communication, of a transition to a power thrifty mode or a switching request notification to request switching from the direct communication to the relay communication via the base station and generating the mode transition notification to the base station; and causing the transition of an operation mode to the power thrifty mode after all responses to the mode transition notification and the switching request notification are received.

According to another embodiment, of the present invention, there is provided a program to cause a computer to function, including a communication control part that controls direct communication or relay communication via a base station with one or two or more other radio communication apparatuses, a data generation part that, generates a mode transition notification to notify all other radio communication apparatuses, which are targets of the direct communication, of a transition to a power thrifty mode or a switching request notification to request switching from the direct communication to the relay communication via the base station, and the mode transition notification to the base station, and a mode control part that causes the transition of an operation mode to the power thrifty mode after all responses to the mode transition notification and the switching request notification are received.

According to another embodiment of the present invention, there is provided a radio communication system, including a first radio communication apparatus and a second radio communication apparatus, having a communication control part that controls direct communication or relay communication via a base station with the first, radio communication apparatus, a data generation part that generates a mode transition notification to notify the first radio communication apparatus of a transition to a power thrifty mode or a switching request notification to request switching from the direct communication to the relay communication via the base station, and the mode transition notification to the base station, and a mode control part that causes the transition of an operation mode to the power thrifty mode after all responses to the mode transition notification and the switching request, notification are received.

According to the embodiments of the present invention described above, the power thrifty mode can be entered while maintaining stability of communication.

BRIEF DESCRIPTION OF THE DRAWINGS

FIG. 4 is an explanatory view showing a configuration example of a data frame;

FIG. 5 is an explanatory view showing a detailed configuration of FrameControl contained in the data frame;

DETAILED DESCRIPTION OF THE PREFERRED EMBODIMENTS

Figure 1:
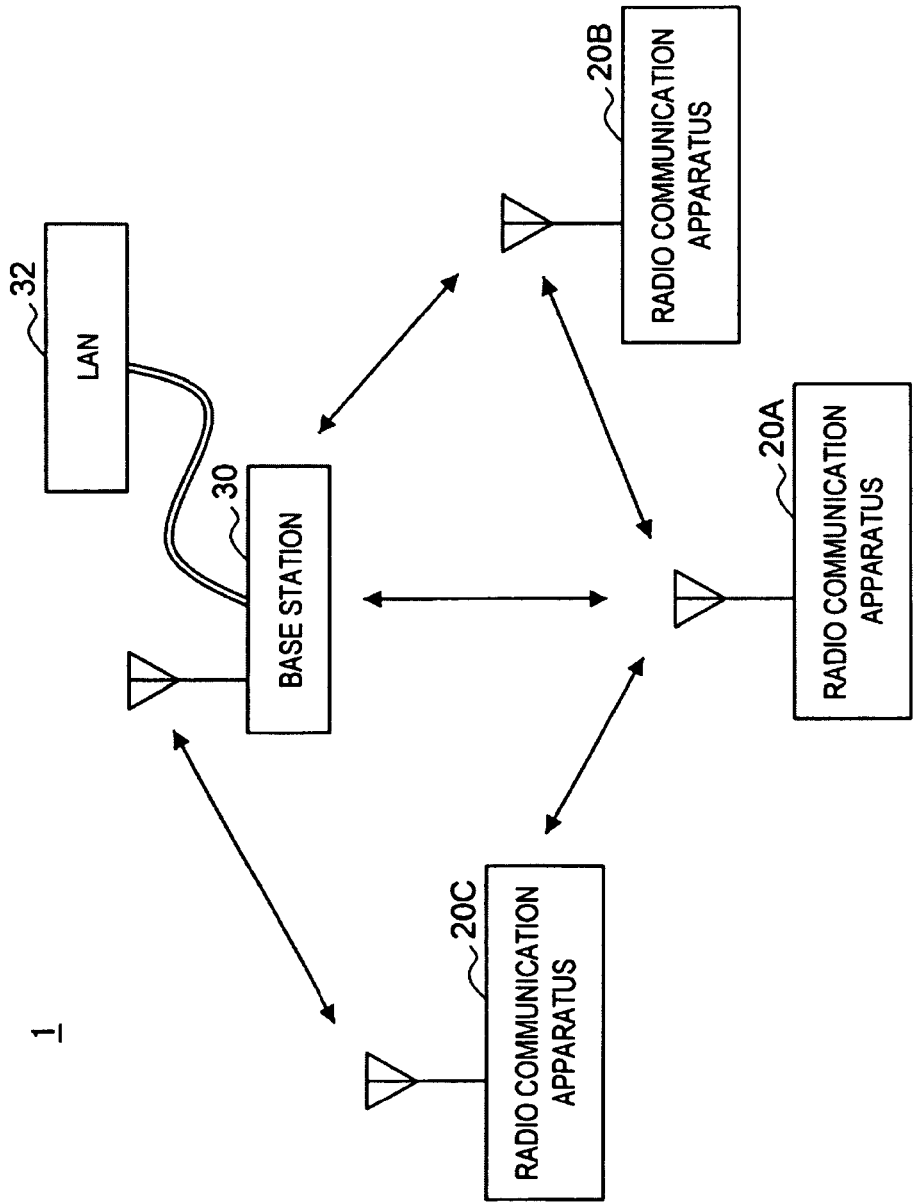
FIG. 1 is an explanatory view showing a configuration of a radio communication system according to the embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"Best Mode for Carrying out the Invention" will be described according to an item sequence shown below:

(1) Overall configuration of radio communication system according to the embodiment of the present invention
(2) Function of radio communication apparatus
(3) Operation of radio communication apparatus
(3-1) First operation example
(3-2) Second operation example
(4) Hardware configuration of radio communication apparatus
(5) Summary

(1) OVERALL CONFIGURATION OF RADIO COMMUNICATION SYSTEM ACCORDING TO THE EMBODIMENT OF THE PRESENT INVENTION

First, the overall configuration of a radio communication system 1 according to the embodiment of the present invention will be described with reference to FIGS. 1 and 2.

FIG. 1 is an explanatory view showing the configuration of the radio communication system 1 according to the embodiment of the present invention. As shown in FIG. 1, the radio communication system 1 includes a radio communication apparatus 20A, a radio communication apparatus 20B, a radio communication apparatus 20C, a base station 30, and a LAN 32.

The base station 30 has the radio communication apparatus 20A, the radio communication apparatus 20B, and the radio communication apparatus 20C present within coverage of radio waves of the base station 30 under the command thereof. The base station 30 is also connected to the LAN 32 as a backbone network such as the Ethernet (registered trademark) and relays communication between the LAN 32 and the radio communication apparatuses 20A to 20C when the LAN 32 and the radio communication apparatuses 20A to 20C perform communication.

The base station 30 controls communication by the radio communication apparatuses 20A to 20C under the command thereof. For example, the base station 30 periodically transmits a beacon, which is a communication management signal, and the radio communication apparatuses 20A to 20C allows the timing of the radio communication system 1 to be shared by receiving the beacon.

When a data frame transmitted from the radio communication apparatus 20A and addressed to the radio communication apparatus 20B is received, the base station 30 transmits the received data frame to the radio communication apparatus 20B. More specifically, the address of the radio communication apparatus 20A is written in TA (Transmitter Address) of the data frame addressed to the radio communication apparatus 20B received from the radio communication apparatus 20A, that, of the base station 30 in RA (Receiver Address), and that of the radio communication apparatus 20B in DA (Destination Address). After receiving the data frame, the base station 30 changes the address of the radio communication apparatus 20B written in the DA to the RA and writes the address of the radio communication apparatus 20A written in the TA in the SA (Source Address) before transmitting the data frame in which TA is changed to the address of the base station 30. Then, the radio communication apparatus 20B can receive the data frame in which the address of the radio communication apparatus 20B is written in RA. Similarly, the base station 30 can relay a data frame transmitted from the radio communication apparatus 20B and addressed to the radio communication apparatus 20A and the data frame transmitted by the radio communication apparatus 20A or the radio communication apparatus 20C.

The radio communication, apparatuses 20A to 20C may be information processing apparatuses, such as PCs (Personal Computers), home video processing devices (e.g. DVD recorders and video cassette recorders), mobile phones, PHS (Personal Handyphone System), mobile music reproducing devices, mobile video processing devices, PDA (Personal Digital Assistants), home game machines, and electric household appliances. Data frames transmitted/received by the radio communication apparatuses 20A to 20C may contain any data, for example, music data such as music, lectures and radio programs, video data such as movies, TV programs, video programs, photos, documents, pictures and diagrams, games, or software. In FIG. 1, an upper-case alphabet is added after the reference numeral like the radio communication apparatuses 20A and 20B to distinguish the radio communication apparatus. However, when there is no need to distinguish each, radio communication apparatus, the radio communication apparatus is simply referred to as the radio communication apparatuses 20.

In FIG. 1, the LAN 32 is shown as an example of a communication network and the communication network includes a WAN (Wide Area Network) and a dedicated line network such as IP-VPN (Internet Protocol-Virtual Private Network).

In the radio communication system 1 described above, in addition to communication (relay communication) using a base station path via the base station 30, the radio communication apparatus 20 can perform, communication (direct communication) using a direct link path by setting a direct link between the radio communication apparatuses 20. The flow until the radio communication apparatuses 20A and 20B validate a direct link, or base station path will be briefly described below with reference to FIG. 2.

Figure 2:
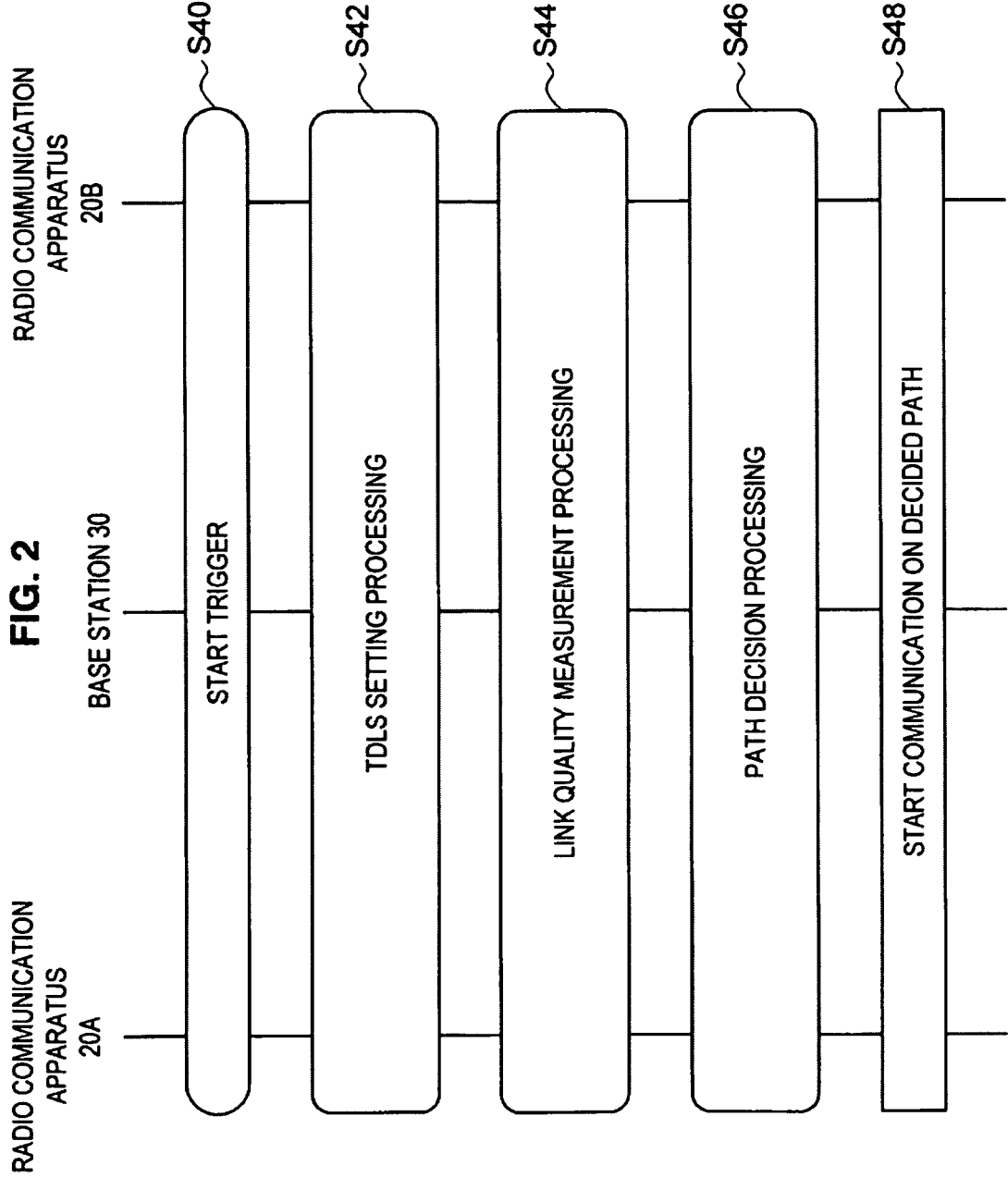
FIG. 2 is a sequence diagram showing a flow until a plurality of radio communication apparatuses validates a direct link or base station path.

FIG. 2 is a sequence diagram showing the flow until a plurality of the radio communication apparatuses 20 validates a direct link or base station path. First, while the radio communication apparatuses 20A and 20B are normally operating in an Infrastructure mode, a setting operation of the TDLS is started based on the generation of a start trigger (S40).

Then, the radio communication apparatus 20A, the base station 30, and the radio communication apparatus 20B perform TDLS setting processing (S42). The TDLS setting processing is a sequence of frame exchange operations by the radio communication apparatuses 20A and 20B to transmit/receive and share information such as the communication function and capability of each of these. Then, the radio communication apparatus 20A, the base station 30, and the radio communication apparatus 20B perform, link quality measurement processing (S44). The link quality measurement processing is a sequence of operations to acquire information about link quality of a direct link path between the radio communication apparatuses 20A and 20B and link quality of a base station path between the radio communication apparatuses 20A and 20B via the base station 30.

Subsequently, at least one of the radio communication apparatus 20A, the base station 30, and the radio communication apparatus 20B performs path decision processing (S46). Path decision processing is an operation to determine and decide which of a direct link path and a base station path is appropriate for communication between the radio communication apparatus 20A and the radio communication apparatus 20B. Then, the radio communication apparatus 20A and the radio communication apparatus 20B validate the communication path decided in the path decision processing and start communication using the validated communication path (S48).

In the foregoing, TDLS between the radio communication apparatuses 20A and 20B is described, but communication can similarly be performed between the radio communication apparatuses 20A and 20C and between the radio communication apparatuses 20B and 20C using a direct link path or base station path.

(2) FUNCTION OF RADIO COMMUNICATION APPARATUS

Next, the function of the radio communication apparatus 20 according to the embodiment of the present invention will be described with reference to FIG. 3 to FIG. 6.

Figure 3:
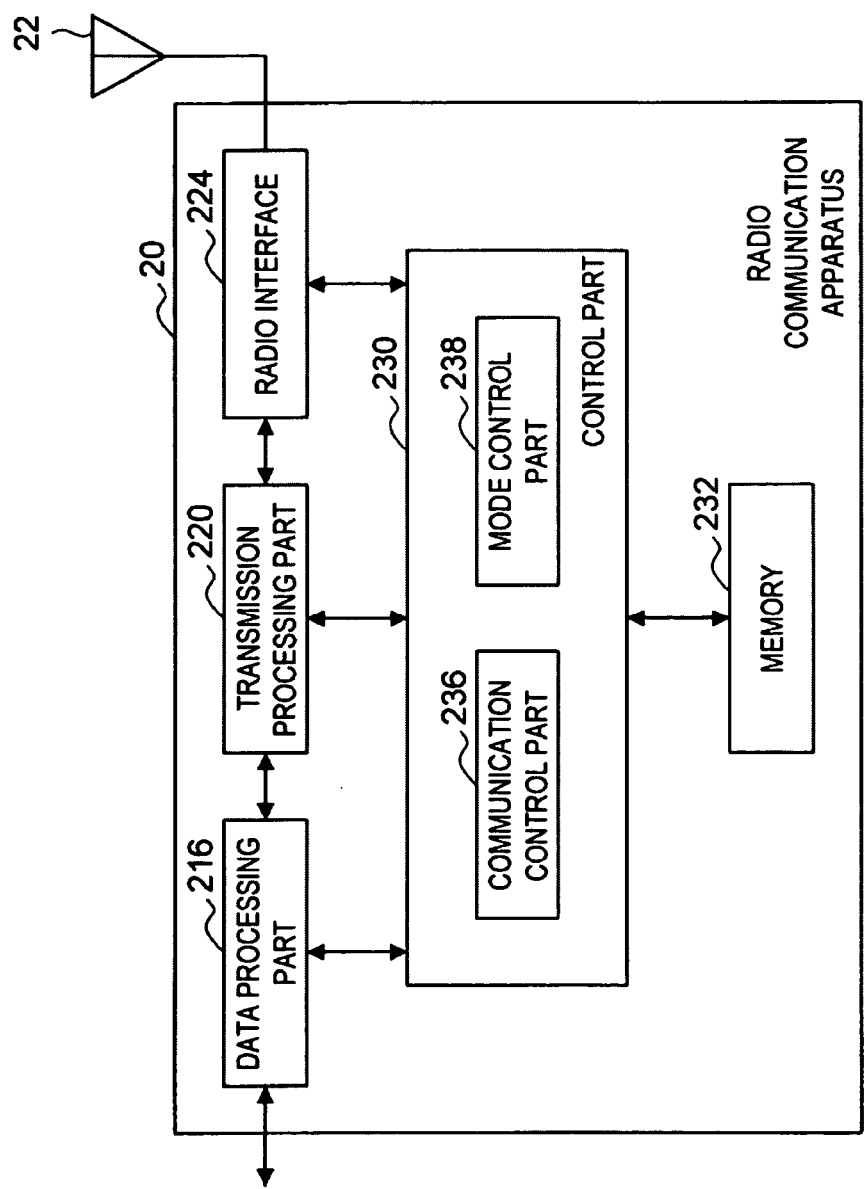
FIG. 3 is an explanatory view showing the configuration of the radio communication apparatus according to the embodiment of the present invention.

FIG. 3 is an explanatory view showing the configuration of the radio communication apparatus 20 according to the embodiment of the present, invention. As shown in FIG. 3, the radio communication apparatus 20 includes an antenna 22, a data processing part 216, a transmission processing part 220, a radio interface 224, a control part 230, and a memory 232.

The data processing part 216 has a function as a generation part, that generates various data frames in accordance with a request, for example, from an upper layer during transmission and supplies the data frames to the transmission processing part 220. The data processing part 216 also processes and analyzes various data frames supplied from the transmission processing part 220 during reception. Various data frames include management frames such as TDLS Setup Request, TDLS Setup Response, a path switching request, and a path switching response, control frames such as RTS (Request To Send), CTS (Clear To Send), and ACK (Acknowledgment), and any frames such as a frame containing real data. Here, the configuration of a data frame processed by the data processing part 216 will be described with reference to FIG. 4 and FIG. 5.

FIG. 4 is an explanatory view showing a configuration example of a data frame. FIG. 5 is an explanatory view showing a detailed configuration of FrameControl contained in a data frame. As shown in FIG. 4, a data frame contains FrameControl, Duration/ID, Address1, Address2, Address3, SequenceControl, Address4, QosControl, FrameBody, and FCS. FrameControl contains, as shown in FIG. 5, ProtocolVersion, Type, SubType, ToDS, FromDS, MorePrag, Retry, PowerManagement, MoreData, Protected, and Order. Address1 to Address4 have meanings shown in Table 1 below in accordance with values of ToDS and FromDS contained in FrameControl.

TABLE 1

| To DS | From DS | Address1 | Address2 | Address3 | Address4 |
|-------|---------|----------|----------|----------|----------|
| 0 | 0 | RA = DA | TA = SA | BSSID | N/A |
| 0 | 1 | RA = DA | TA = BSSD | SA | N/A |
| 1 | 0 | RA = BSSID | TA = SA | DA | N/A |
| 1 | 1 | RA | TA | DA | SA |

PowerManagement indicates the operation mode of the transmission source apparatus of the data frame in question. More specifically, PowerManagement has "0" written therein when the operation mode is the active mode, which is a normal operation mode, and "1" when the operation mode is the power save mode (power thrifty mode), which consumes less power than the active mode. Therefore, a data frame in whose PowerManagement "1" is written functions as a mode transition notification.

MoreData indicates whether or not there is any data frame subsequent to the data frame in question addressed to the radio communication apparatus 20 in power save mode. More specifically, MoreData has "1" written therein when there is a data frame subsequent to the data frame in question and "0" when there is no data frame, subsequent to the data frame in question.

The transmission processing part 220 adds a header and error detection code such as FCS (Frame Check Sequence) to various data frames supplied from the data processing part 216 during transmission before supplying the data frames to the radio interface 224. The transmission processing part 220 also analyzes the header added to various data frames supplied from the radio interface 224 during reception and, if the data frames are verified error-free based on error detection code, supplies the various data frames to the data processing part 216.

The radio interface 224 generates a modulating signal in the frequency band of carriers based on various data frames supplied from the transmission processing part 220 during transmission and causes the antenna 22 to transmit the modulating signal as a radio signal. The radio interface 224 also decodes various data frames by down-converting a radio signal received from the antenna 22 during reception for conversion into a bit string. That is, the radio interlace 224 can function as a transmission part and also as a reception part, in collaboration with the antenna 22. While only one antenna 22 is shown in FIG. 3, the radio communication apparatus 20 may have a plurality of the antennas 22 and an MIMO (Multiple Input Multiple Output) function.

The memory 232 has a role as a work area of data processing by the control part 230 and a function as a storage medium to hold various kinds of data. For example, the memory 232 may be a nonvolatile memory such as an EEPROM (Electrically Erasable Programmable Read-Only Memory) and EPROM (Erasable Programmable Read-Only Memory), a magnetic disk such as a hard disk and disc magnetic disk, an optical disk such as a CD-R (Compact. Disc Recordable)/RW (Rewritable), DVD-R (Digital Versatile Disc Recordable)/ RW/+R/+RW/RAM (Random Access Memory), and BD (Blu-Ray Disc (registered trademark)), and a storage medium such as an MO (Magneto Optical) disk.

The control part 230 has functions of a communication control part 236 and a mode control part 238 and controls overall operations of the radio communication apparatus 20. The communication control part 236 controls communication using a direct link path and that using a base station path by instructing the data processing part 216 to generate various data frames. The communication control part 236 also causes the memory 232 to hold content (for example, a communication function held by the partner to which a direct link is set) of data frames analyzed by the data processing part 216 when necessary.

The communication control part 236 also exercises communication control for transition to the PPSM Client mode, which is a power save mode when a direct link path is in use, and communication control in PPSM Client mode. The mode control part 238 controls the operation mode transition, for example, the transition from the active mode to the PPSM Client mode and that from the PPSM Client mode to the active mode. The PPSM will be described below with reference to FIG. 6.

Figure 6:
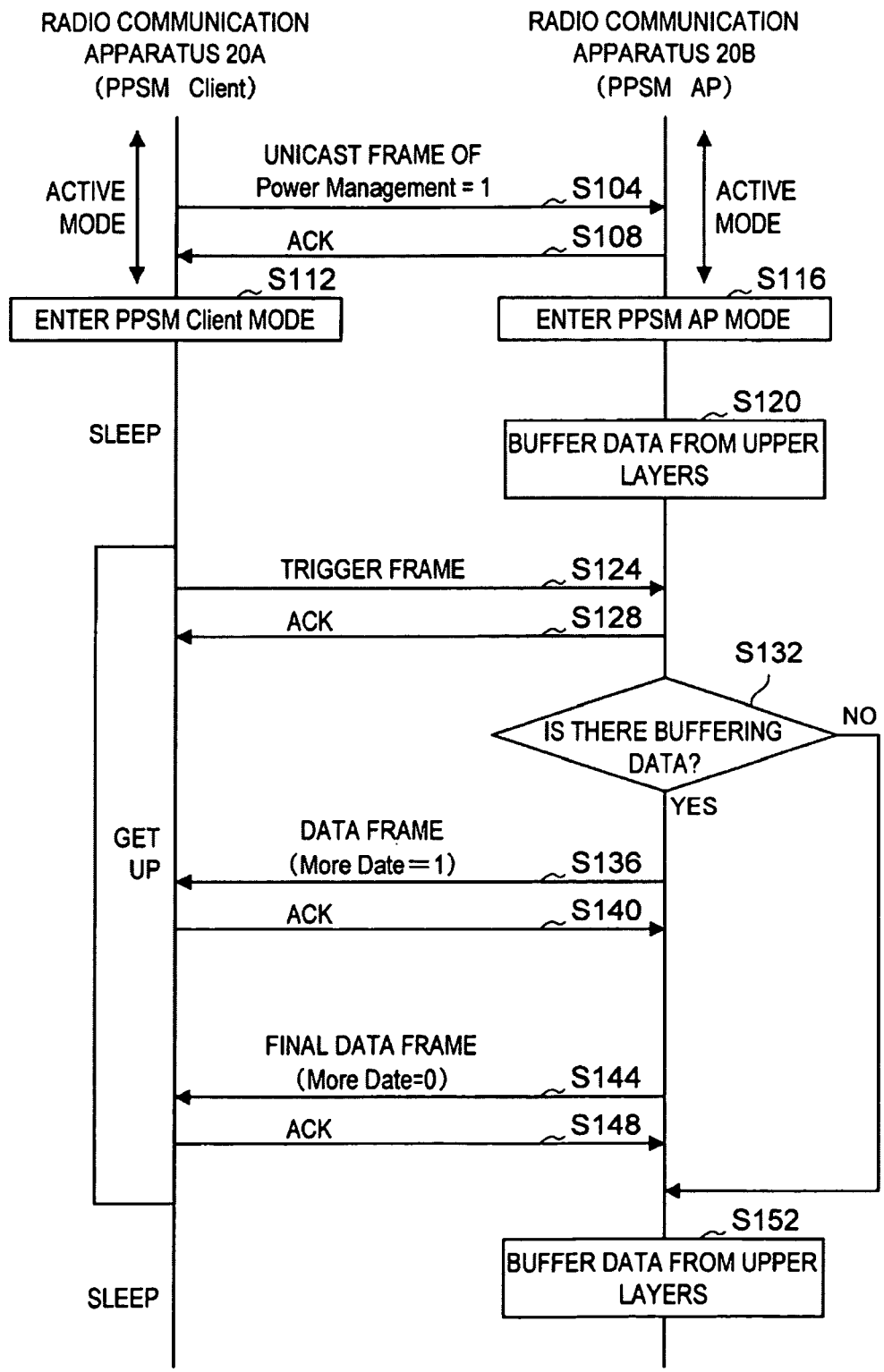
FIG. 6 is a sequence diagram, showing the flow of a sequence of PPSM.

FIG. 6 is a sequence diagram showing the flow of a sequence of PPSM. In FIG. 6, it is assumed that a radio communication apparatus 20A corresponds to the PPSM Client mode, a radio communication apparatus 20B corresponds to a PPSM AP mode, and both the radio communication apparatuses 20 perform communication in active mode using a direct link path. Here, when the radio communication apparatus 20A enters the PPSM Client mode, the data processing part 216 generates a data frame whose PowerManagemeat contained in FrameControl is "1" based on control by the communication control part 236. Then, the data frame is transmitted to the radio communication apparatus 20B as a unicast frame (S104). The radio communication apparatus 20B that receives the data frame whose PowerManagement is "1" sends back ACK to the radio communication apparatus 20A (S108).

The mode control part 238 of the radio communication apparatus 20A causes the transition of the operation mode of the radio communication apparatus 20A to the PPSM Client mode using reception of ACK from the radio communication apparatus 20B as a trigger (S112). Similarly, the mode control part 238 of the radio communication apparatus 20B causes the transition of the operation mode of the radio communication apparatus 20B to the PPSM AP mode (S116). It is assumed that each of the radio communication apparatuses 20 has grasped whether or not the other radio communication apparatus 20 supports the PPSM Client mode or the PPSM AP mode in the TDLS setting processing shown in FIG. 2.

Contents of the PPSM Client mode and the PPSM AP mode are substantially the same as operations of a station and an access point in the U-APSD function defined in IEEE802.11e. That is, when data addressed to the radio communication apparatus 20A is generated in an upper layer, the radio communication apparatus 20B operating in PPSM AP mode buffers the data (S120).

Then, when the radio communication apparatus 20A operating in PPSM Client mode wakes up, the radio communication apparatus 20A transmits a trigger frame to the radio communication apparatus 20B (S124) and the radio communication apparatus 20B transmits ACE after receiving the trigger frame (S125). Here, information indicating the access category (AC_BK, AC_BE, AC_VI, and AC_VO) is written in QosControl of the trigger frame. When data of the access category indicated by QosControl of the trigger frame is buffered (S132), the radio communication apparatus 20B generates a data frame based on the buffered data and transmits the data frame (S136). After receiving the data frame from the radio communication apparatus 20B, the radio communication apparatus 20A sends back ACK (S140). Since there is a subsequent, data frame, the radio communication apparatus 20B transmits a data frame having "1" written in MoreData in S136.

Further, when the radio communication apparatus 20B transmits a data frame having "0" written in MoreData (S144), the radio communication apparatus 20A sends back ACK and sleeps (S145). In this manner, the radio communication apparatus 20A operating in PPSM Client mode reduces power consumption by remaining awake during transmission of data frames from the radio communication apparatus 20B and sleeping after receiving the final data frame. If data addressed to the radio communication apparatus 20A is subsequently generated in an upper layer, the radio communication apparatus 20A buffers the data (S152).

In the foregoing, management of the operation mode between the radio communication apparatuses 20A and 20B performing communication using a direct link path is described. In reality, however, the radio communication apparatus 20A also has connection relations with the base station 30 and the radio communication apparatus 20C and thus, it is desirable to manage the operation mode by considering relations with the base station 30 and the radio communication apparatus 20C. An operation example of the transition of the radio communication apparatus 20A to the PPSM Client mode by considering, in addition to the radio communication apparatus 20B, the base station 30 and the radio communication apparatus 20C will be described below.

(3) OPERATION OF RADIO COMMUNICATION APPARATUS (3-1) First Operation Example

Figure 7:
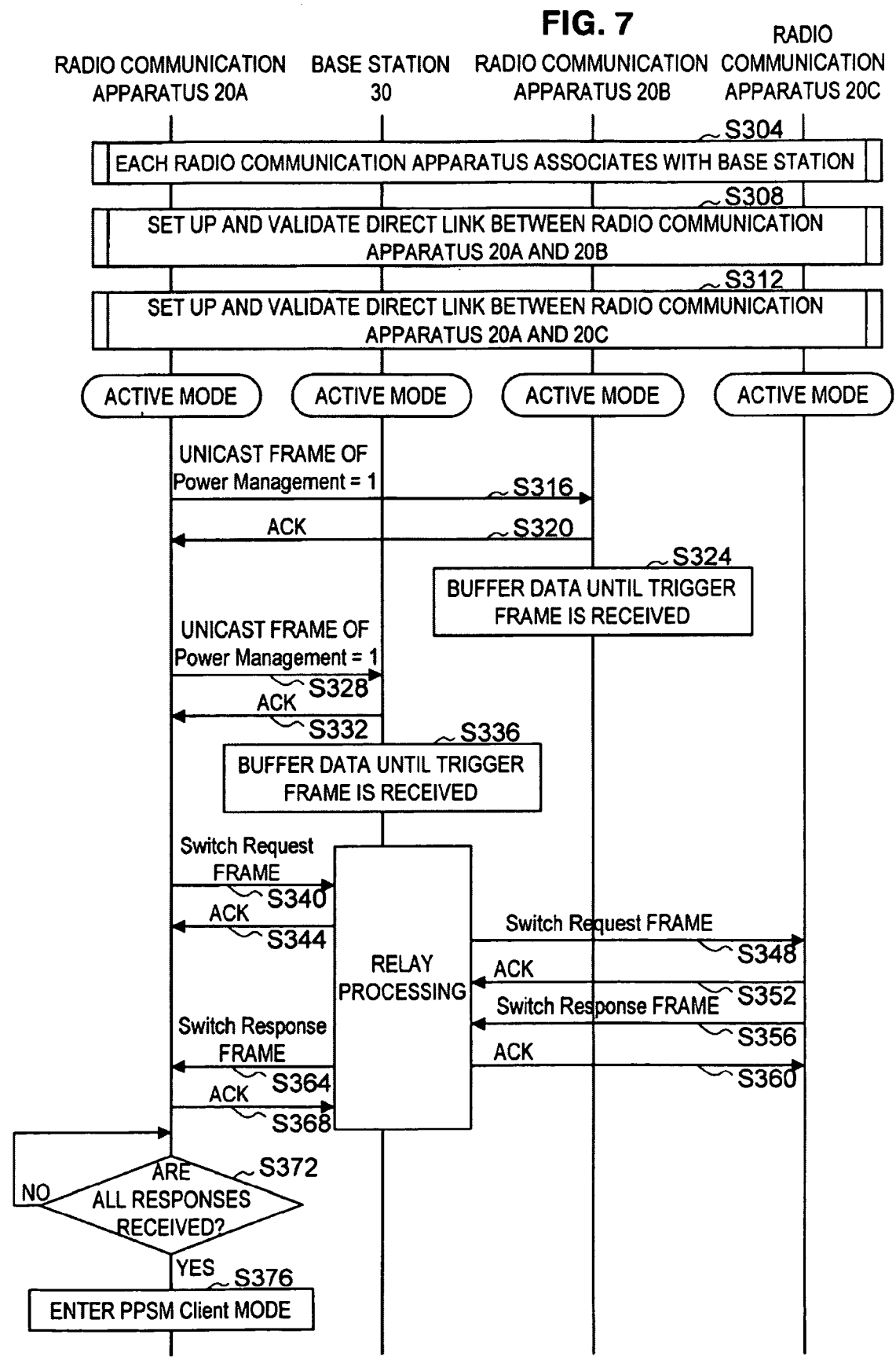
FIG. 7 is a sequence diagram showing the How of a first operation example for the radio communication apparatus to enter the PPSM Client, mode.

FIG. 7 is a sequence diagram showing the flow of a first operation example for the radio communication apparatus 20A to enter the PPSM Client mode. In FIG. 7, it is assumed that while the radio communication apparatus 20B supports the PPSM AP mode, the radio communication apparatus 20C does not support the PPSM AP mode.

First, as shown in FIG. 7, each of the radio communication apparatuses 20 is connected to the base station 30 by association (S304). Then, the radio communication apparatuses 20A and 20B perform, direct link setup to have a direct link path validated (S308), and the radio communication apparatuses 20A and 20C perform direct link setup to have a direct link path validated (S312). Processing at S308 and S312 corresponds, for example, a sequence of processing shown in FIG. 2. At this point, the radio communication apparatuses 20A to 20C and the base station 30 operate in active mode.

Then, when the radio communication apparatus 20A enters the PPSM Client mode, the data processing part 216 generates a data frame whose PowerManagement contained in FrameControl is "1" based on control by the communication control part 236. Then, the data frame is transmitted to the radio communication apparatus 20B as a unicast frame (S316). The radio communication apparatus 20B that receives the data frame whose PowerManagement is "1"

sends back ACK to the radio communication apparatus 20A (S320). Hereinafter, when data addressed to the radio communication apparatus 20A is generated in an upper layer, the radio communication apparatus 20B buffers the data (S324). That is, the radio communication apparatus 20B operates in PPSM AP mode in relation to the radio communication apparatus 20A.

With the above processing, the transition of the radio communication apparatus 20A to the PPSM Client mode is approved between the radio communication apparatuses 20A and 20B. However, if the transition of the radio communication apparatus 20A to the PPSM Client mode occurs at this stage, down-link transmission from the base station 30 that has not yet grasped the transition and transmission from the radio communication apparatus 20C using a direct link path could occur. Thus, the radio communication apparatus 20A according to the embodiment of the present invention enters the PPSM Client mode while maintaining stability of communication by making a specific notification to all the apparatuses communicating using a direct link path and the base station 30.

More specifically, the radio communication apparatus 20A also transmits a data frame whose PowerManagement contained in FrameControl is "1" to the base station 30 (S328). The base station 30 that receives the data frame whose PowerManagement is "1" sends back ACK to the radio communication apparatus 20A (S332). Hereinafter, when data addressed to the radio communication apparatus 20A is generated, the base station 30 basically buffers the data (S336).

Further, it is necessary for the radio communication apparatus 20A to notify the radio communication apparatus 20C with which a direct, link path is validated of the transition to the PPSM Client mode. However, the radio communication apparatus 20C does not support, the PPSM AP mode and thus, switching from a direct link path to a base station path is requested from the radio communication apparatus 20C to prevent transmission of any data frame from the radio communication apparatus 20C in PPSM Client mode.

More specifically, the data processing part 216 of the radio communication apparatus 20A first transmits TDLS AP Path Switch Request to the base station 30 based on control by the communication control part 236 (S340). Then, the base station 30 that, receives TDLS AP Path Switch Request sends back ACK to the radio communication apparatus 20A (S344) and relays TDLS AP Path Switch Request to the radio communication apparatus 20C (S348). Then, the radio communication apparatus 20C sends back ACK to TDLS AP Path Switch Request to the base station 30 (S352).

Here, TDLS AP Path Switch Request is a switching request notification to request validation of a base station path. That, is, TDLS AP Path Switch Request is a data frame requesting the stop of use of the direct link path. Therefore, the radio communication apparatus 20C transmits TDLS AP Path Switch Response responding to TDLS AP Path Switch Request to the base station 30 to validate the base station path (S356). The base station 30 sends back ACK to TDLS AP Path Switch Response to the radio communication apparatus 20C (S360) and relays TDLS AP Path Switch Response to the radio communication apparatus 20A (S364). Then, the radio communication apparatus 20A sends back ACK to TDLS AP Path Switch Response to the base station 30 (S368).

The mode control part 238 of the radio communication apparatus 20A determines whether or not all responses to notification to each communication apparatus have been received (S372). Here, ACK sent back from the radio communication apparatus 20B at S320, ACK sent back from the base station 30 at S332, and TDLS AP Path Switch Response relayed from the base station 30 at S364 correspond to responses. If there is no other communication apparatus having a connection relation, the mode control part 238 of the radio communication apparatus 20A causes the transition of the operation mode of the radio communication apparatus 20A to the PPSM Client mode (S376).

In this manner, the mode control part 238 causes the transition of the operation mode to the PPSM Client mode on condition that responses from all communication apparatuses having connection relations have been received. Therefore, in the embodiment of the present invention, the possibility of a data frame being transmitted to the radio communication apparatus 20 operating in PPSM Client mode and sleeping can more reliably be prevented.

(3-2) Second Operation Example

In the first operation example, an example in which the radio communication apparatus 20A makes a notification in the order of the radio communication apparatus 20B and the base station 30 that support the PPSM AP mode and the radio communication apparatus 20C that does not support the PPSM AP mode is described, but the order of notification is arbitrary. For example, like a second operation example shown in FIG. 8, the notification to the base station 30 may be the last one.

Figure 8:
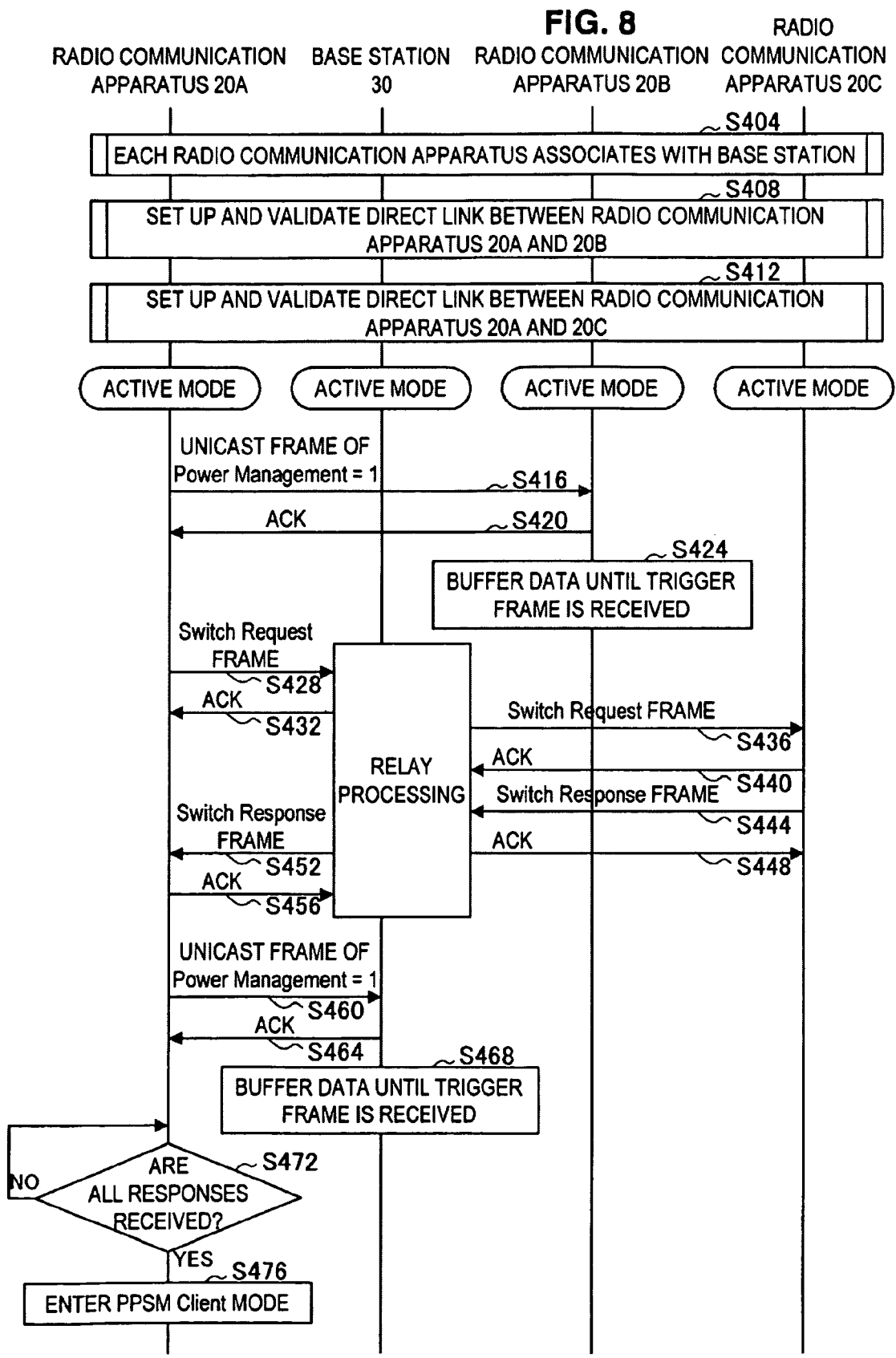
FIG. 8 is a sequence diagram showing the flow of a second operation example for the radio communication apparatus to enter the PPSM Client mode.

FIG. 8 is a sequence diagram showing the flow of a second operation example for the radio communication apparatus 20A to enter the PPSM Client mode. In FIG. 8, it is assumed that while the radio communication apparatus 20B supports the PPSM AP mode, the radio communication apparatus 20C does not support the PPSM AP mode.

First, as shown in FIG. 8, each of the radio communication apparatuses 20 is connected to the base station 30 by association (S404). Then, the radio communication apparatuses 20A and 20B perform direct link setup to have a direct link path validated (S408), and the radio communication apparatuses 20A and 20C perform direct link setup to have a direct link path validated (S412). Processing at S408 and S412 corresponds, for example, a sequence of processing shown in FIG. 2. At this point, the radio communication apparatuses 20A to 20C and the base station 30 operate in active mode.

Then, when the radio communication apparatus 20A enters the PPSM Client mode, the data processing part 216 generates a data frame whose PowerManagement contained in FrameControl is "1" based on control by the communication control part 236. Then, the data frame is transmitted to the radio communication apparatus 20B as a unicast frame (S416). The radio communication apparatus 20B that receives the data frame whose PowerManagement is "1" sends back ACK to the radio communication apparatus 20A (S420). Hereinafter, when data addressed to the radio communication apparatus 20A is generated in an upper layer, the radio communication apparatus 20B buffers the data (S424). That, is, the radio communication apparatus 20B operates in PPSM AP mode in relation to the radio communication apparatus 20A.

With the above processing, the transition of the radio communication apparatus 20A to the PPSM Client mode is approved between the radio communication apparatuses 20A and 20B. However, if the transition of the radio communication apparatus 20A to the PPSM Client mode occurs at this stage, down-link transmission from the base station 30 that has not yet grasped the transition and transmission from the radio communication apparatus 20C using a direct link path could occur. Thus, the radio communication apparatus 20A according to the embodiment of the present invention enters the PPSM Client mode while maintaining stability of communication by making a specific notification to all apparatuses having a connection relation.

However, the radio communication apparatus 20C does not support PPSM AP mode and thus, switching from a direct link path to a base station path is requested from the radio communication apparatus 20C to prevent transmission of any data frame from the radio communication apparatus 20C in PPSM Client mode.

More specifically, the data processing part 216 of the radio communication apparatus 20A first transmits TDLS AP Path. Switch Request to the base station 30 based on control by the communication control part 236 (S428). Then, the base station 30 that receives TDLS AP Path Switch Request sends back ACK to the radio communication apparatus 20A (S432) and relays TDLS AP Path Switch Request to the radio communication apparatus 20C (S436). Then, the radio communication apparatus 20C sends back ACK to TDLS AP Path Switch Request, to the base station 30 (S440).

Here, TDLS AP Path Switch Request is a data frame to request validation of a base station path. Therefore, the radio communication apparatus 20C transmits TDLS AP Path Switch Response responding to TDLS AP Path Switch Request to the base station 30 to validate the base station path (S444). The base station 30 sends back ACK to TDLS AP Path Switch Response to the radio communication apparatus 20C (S448) and relays TDLS AP Path Switch Response to the radio communication apparatus 20A (S452). Then, the radio communication apparatus 20A sends back ACK to TDLS AP Path Switch Response to the base station 30 (S456).

Further, the radio communication apparatus 20A also transmits a data frame whose PowerManagement contained in FrameControl is "1" to the base station 30 (S460). The base station 30 that receives the data frame whose PowerManagement is "1" sends back ACK to the radio communication apparatus 20A (S464). Hereinafter, when data addressed to the radio communication apparatus 20A is generated, the base station 30 basically buffers the data (S468).

The mode control part 238 of the radio communication apparatus 20A determines whether or not all responses to notification to each communication apparatus have been received (S472). Here, ACK sent back from the radio communication apparatus 20B at S420, ACK sent back from the base station 30 at S464, and TDLS AP Path Switch Response relayed from the base station 30 at S452 correspond to responses. If there is no other communication apparatus having a connection relation, the mode control part 238 of the radio communication apparatus 20A causes the transition of the operation mode of the radio communication apparatus 20A to the PPSM Client, mode (S476).

The first operation example and the second operation example will be described below. In the first, operation example, the base station 30 relays TDLS AP Path Switch Response and the like to the radio communication apparatus 20A even after a data frame whose PowerManagement is "1" is received from the radio communication apparatus 20A. Therefore, to realize the first operation example, described above, setting to exclude TDLS AP Path Switch Response and the like as targets of buffering in the base station 30 can be considered. In contrast, in the second operation example, a notification is made to the base station 30 after the radio communication apparatus 20C that does not support the PPSM AP mode and thus, no special setting in the base station 30 is effective like the first, operation example for realization thereof.

(4) HARDWARE CONFIGURATION OF RADIO COMMUNICATION APPARATUS

Subsequently, the hardware configuration of the radio communication apparatus 20 described above will be described with reference to FIG. 9.

Figure 9:
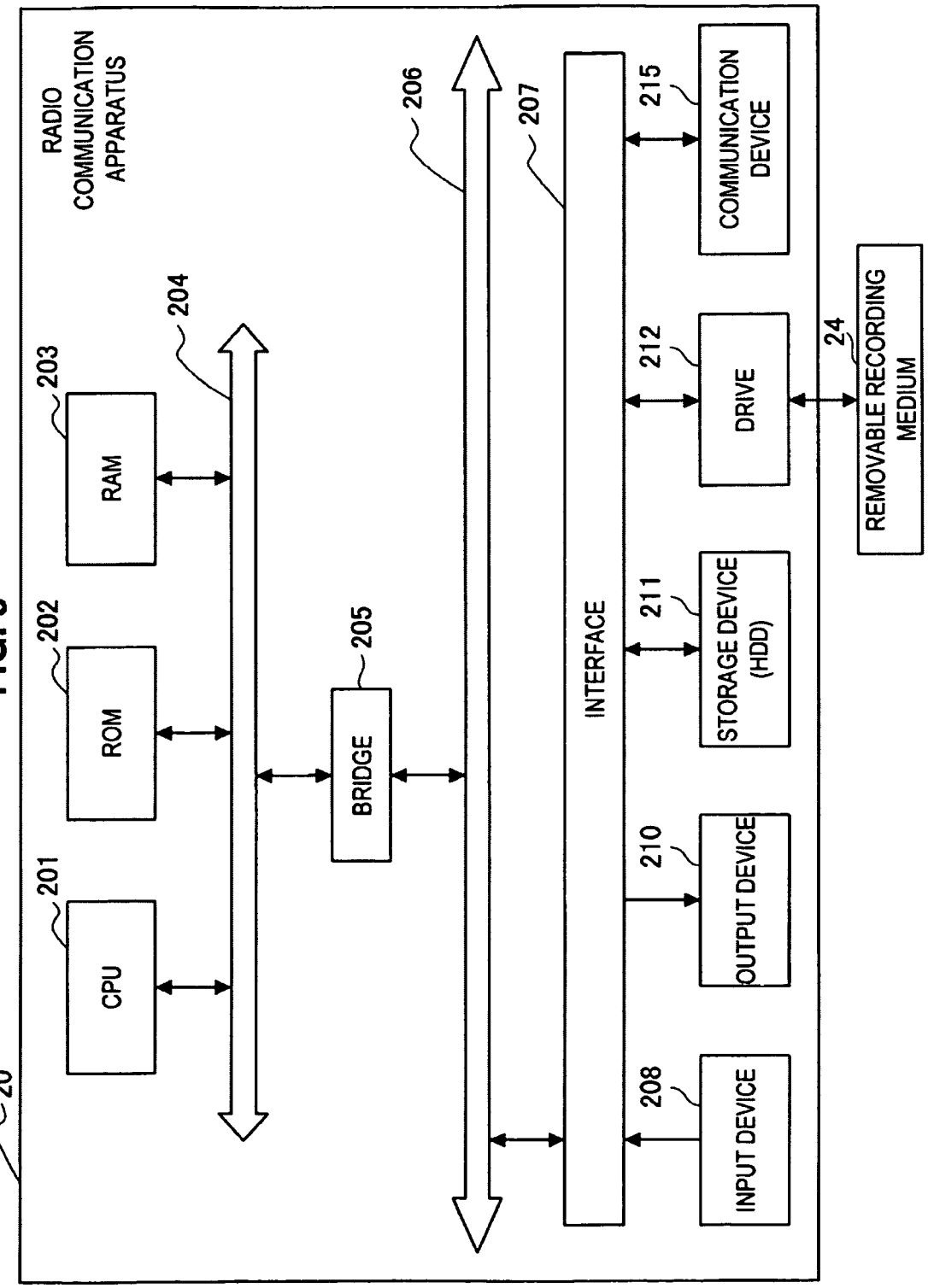
FIG. 9 is a block diagram showing the hardware configuration of the radio communication apparatus.

FIG. 9 is a block diagram showing the hardware configuration of the radio communication apparatus 20. The radio communication apparatus 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212, and communication device 215.

The CPU 201 functions as an arithmetic processing unit and also as a control unit and controls overall operations in the radio communication apparatus 20 according to various kinds of programs (for example, corresponding to the control part 230). The CPU 201 may be a microprocessor. The ROM 202 stores programs, arithmetic parameters and the like used by the CPU 201. The RAM 203 primarily stores programs used by the CPU 201 and parameters and the like appropriately changing in execution thereof (for example, corresponding to the memory 232). These components are mutually connected by the host bus 204 constituted by a CPU bus or the like.

The host bus 204 is connected to the external bus 206 such as a PCI (Peripheral Component Interconnect/Interface) bus via the bridge 205. Incidentally, the host bus 204, the bridge 205, and the external bus 206 do not have to be necessarily formed separately and these functions may be implemented in a single bus.

The input device 208 is configured by an input means for a user to input information such as a mouse, keyboard, touch panel, button, microphone, switch, and lever and an input control circuit that generates an input signal based on input by the user and outputs the input signal to the CPU 201. The user of the radio communication apparatus 20 can input various kinds of data and give instructions on processing operations to the radio communication apparatus 20 by operating the input device 208.

The output device 210 is configured by a display device such as a CRT (Cathode Ray Tube) display device, liquid crystal display (LCD) device, OLED (Organic Light Emitting Display) device, and lamp and a sound output device such as a speaker and headphone. The output device 210 outputs, for example, reproduced content. More specifically, the display device displays various kinds of information such as reproduced video data as text or images. The sound output device, on the other hand, converts reproduced sound data and the like into sound and outputs the sound.

The storage device 211 is a device for data storage configured as an example of the storage part of the radio communication apparatus 20 according to the embodiment of the present, invention. The storage device 211 may contain a storage medium, a recording device for recording data in the storage medium, a reading device for reading data from the storage medium, and a deleting device for deleting data recorded in the storage medium. The storage device 211 is constituted, for example, by an HDD (hard Disk Drive). The storage device 211 drives a hard, disk and stores programs executed by the CPU 201 and various kinds of data. Moreover, information (for example, support/non-support of the PPSM Client mode and PPSM AP mode) about, communication apparatuses having connection relations with the radio communication apparatus 20 is stored in the storage device 211.

The drive 212 is a reader/writer for a storage medium and is installed in the radio communication apparatus 20 internally or externally. The drive 212 reads out information recorded in a removable recording medium 24 such as an inserted magnetic disk, optical disk, magneto-optical disk, and semiconductor memory and outputs the information to the RAM 203.

The communication device 215 is a communication interface constituted by a communication device or the like for communicating with the base station 30 or the other radio communication apparatuses 20 (for example, corresponding to the antenna 22, the radio interface 224 and the like). The communication device 215 may be a radio LAN (Local Area Network) compliant communication apparatus, wireless USB compliant communication apparatus, or wire communication apparatus that performs communication by wire.

(5) SUMMARY

In the embodiment of the present invention, as described above, the mode control part 238 causes the transition of the operation mode to the PPSM Client mode on condition that responses from all communication apparatuses (including the base station 30) having connection relations have been received. Therefore, in the embodiment of the present, invention, the possibility of a data frame being transmitted to the radio communication apparatus 20 operating in PPSM Client mode and sleeping can more reliably be prevented.

It should be understood by those skilled in the art that various modifications, combinations, sub-combinations and alterations may occur depending on design requirements and other factors insofar as they are within the scope of the appended claims or the equivalents thereof.

In the foregoing, for example, examples in which the base station 30 is independently notified of the transition to the PPSM Client mode even when the radio communication apparatus 20C that does not support the PPSM AP mode is present, but the present invention is not limited to such examples. For example, the radio communication apparatus 20A may transmit TDLS AP Path Switch Request in whose PowerManagement "1" is written to the radio communication apparatus 20C via the base station 30. In this case, the base station 30 can grasp that the radio communication apparatus 20A enters the PPSM Client mode based on the description in PowerManagement contained in TDLS AP Path Switch Request. That is, radio communication apparatus 20A can cause TDLS AP Path Switch Request to function as a notification to the base station 30 (Processing at S460 to S468 in FIG. 8 can be omitted). In this case, TDLS AP Path Switch Response may be handled as a response from the base station 30 and the radio communication apparatus 20C.

Each step in processing of the radio communication system 1 described, herein does not have to be necessarily processed chronologically in a sequence shown as sequence diagrams. For example, each step in processing of the radio communication system 1 may contain processing (for example, parallel processing or processing by objects) performed in parallel or individually.

A computer program causing hardware such as the CPU 201, the ROM 202, and RAM 203 contained in the radio communication apparatus 20 to function equivalently to each component described above of the radio communication apparatus 20 can be created. A storage medium in which the computer program is stored is also provided. A sequence of processing can be realized by hardware by configuring each functional block shown in the functional block diagram in FIG. 3 by hardware.

The present application contains subject matter related to that disclosed in Japanese Priority Patent Application JP 2008-135972 filed in the Japan Patent Office on May 23, 2008, the entire content of which is hereby incorporated by reference.

What is claimed is:

1. A radio communication apparatus, comprising:
a communication control part configured to control at least one of direct communication or relay communication with one or more target radio communication apparatuses, the relay communication occurring through a base station;
a data generation part configured to generate at least one of a mode transition notification or a switching request notification, wherein:
the mode transition notification comprises information notifying at least one of the target radio communication apparatuses of a transition to a power thrifty mode;
the switching request notification comprising a request to switch from direct communication with at least one of the target radio communication apparatuses to relay communication via the base station; and
the communication control part is further configured to generate instructions to transmit the mode transition notification to the at least one target radio communication apparatus, and to transmit the switching request notification to the base station; and
a mode control part configured to transition of an operation mode to the power thrifty mode upon receipt of corresponding responses to the mode transition notification from the at least one target radio communication apparatus and a response to the switching request notification from the base station, wherein:
the data generation part is further configured to:
identify a first subset of the target radio communications apparatuses having functionality to transmit data to at least one of the target radio communication apparatuses that has entered the power thrifty mode; and
identify a second subset of the target radio communication apparatuses that lack the transmit functionality; and
the data processing part is further configured to:
transmit the mode transition notification to the first subset of the target radio communication apparatuses; and
transmit the switching request notification to the second subset of the target radio communication apparatuses.

2. The radio communication apparatus of claim 1, wherein the communication control part is further configured to generate instructions to transmit the mode transition notification to the base station after transmission of the switching request notification to the base station.

3. A method, comprising:
controlling at least one of direct communication or relay communication between a source radio communications apparatus and one or more target radio communication apparatuses, the relay communication occurring through a base station;
generating at least one of a mode transition notification or a switching request notification, wherein:
the mode transition notification comprises information notifying at least one of the target radio communication apparatuses of a transition of an operation mode of the source radio communications apparatus to a power thrifty mode; and the switching request notification comprising a request to switch from direct communication with at least one of the target radio communication apparatuses to relay communication via the base station;

identifying (i) a first subset of the target radio communications apparatuses having functionality to transmit data to at least one of the target radio communication apparatuses that has entered the power thrifty mode, and (ii) a second subset of the target radio communication apparatuses that lack the transmit functionality;

generating instructions to transmit the mode transition notification to the at least one target radio communication apparatus, and to transmit the switching request notification to the base station; and generating instructions to transition the operation mode to the power thrifty mode upon receipt of corresponding responses to the mode transition notification from the at least one target radio communication apparatus and a response to the switching request notification from the base station, wherein generating the instructions to transmit further comprises generating instructions to transmit the mode transition notification to the first subset of the target radio communication apparatuses and to transmit the switching request notification to the second subset of the target radio communication apparatuses.

4. A tangible, non-transitory computer-readable medium storing instructions that, when executed by at least one processor, cause the at least one processor to perform a method, comprising:

controlling at least one of direct communication or relay communication between a source radio communications apparatus and one or more target radio communication apparatuses, the relay communication occurring through a base station;

generating at least one of a mode transition notification or a switching request notification, wherein:

the mode transition notification comprises information notifying at least one of the target radio communication apparatuses of a transition of an operation mode of the source radio communications apparatus to a power thrifty mode; and the switching request notification comprising a request to switch from direct communication with at least one of the target radio communication apparatuses to relay communication via the base station;

identifying (i) a first subset of the target radio communications apparatuses having functionality to transmit data to at least one of the target radio communication apparatuses that has entered the power thrifty mode, and (ii) a second subset of the target radio communicating apparatus that lack the transmit functionality;

generating instructions to transmit the mode transition notification to the at least one target radio communication apparatus, and to transmit the switching request notification to the base station; and generating instructions to transition the operation mode to the power thrifty mode upon receipt of corresponding responses to the mode transition notification from the at least one target radio communication apparatus and a response to the switching request notification from the base station, wherein generating the instruction to transmit further comprises generating instructions to transmit the mode transition notification to the first subset of the target radio communication apparatus and to transmit the switching request notification to the second subset of the target radio communication a apparatuses.

5. A radio communication system, comprising:
a first radio communication apparatus; and
a second radio communication apparatus, including:
a communication control part configured to control at least one of direct communication or relay communication with the first radio communication apparatus, the relay communication occurring through a base station;

a data generation part configured to generate at least one of a mode transition notification or a switching request notification, wherein:
the mode transition notification comprises information notifying the first radio communication apparatus of a transition to a power thrifty mode;
the switching request notification comprising a request to switch from direct communication with the first radio communications apparatus to relay communication via the base station; and
the communication control part is further configured to generate instructions to transmit the mode transition notification to the first radio communication apparatus, and to transmit the switching request notification to the base station; and a mode control part configured to transition an operation mode to the power thrifty mode upon receipt of corresponding responses to the mode transition notification from the first radio communication apparatus and a response to the switching request notification from the base station, wherein:

the data generation part is further configured to:
identify a first subset of one or more target radio communications apparatuses having functionality to transmit data to the first target radio communication apparatus that has entered the power thrifty mode; and
identify a second subset of the target radio communication apparatuses that lack a transmit functionality; and the data processing part is further configured to:
transmit the mode transition notification to the first subset of the target radio communications apparatuses; and
transmit the switching request notification to the second subset of the target radio communications apparatus.

* * * * *